3,763,289
O-ETHYL-S-ALKOXYETHYL-S-PHENYL-
PHOSPHORODITHIOLATES
Shigeo Kishino, Tokyo, and Akio Kudamatsu and Kozo
Shiokawa, Kanagawa-ken, Japan, assignors to Bayer
Aktiengesellschaft, Leverkusen, Germany
No Drawing. Filed May 18, 1971, Ser. No. 144,685
Claims priority, application Japan, May 22, 1970,
45/43,264
Int. Cl. C07f 9/16; A01n 9/36
U.S. Cl. 260—950         8 Claims

ABSTRACT OF THE DISCLOSURE

O-ethyl-S-alkoxyethyl - S - phenyl-phosphorodithiolates of the general formula

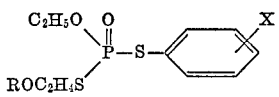

(I)

in which

R is a lower alkyl group, and
X is a hydrogen or halogen atom or a lower alkyl group, which possess insecticidal, acaricidal, nematocidal and fungicidal properties.

---

The present invention relates to and has for its objects the provision of particular new O-ethyl-S-alkoxyethyl-S-phenyl-phosphorodithiolates, i.e. O-ethyl - S - (2 - lower alkoxyethyl - S - (optionally halo- or lower alkyl-substituted)phenyl - phosphorodithiolates, which possess insecticidal, acaricidal, nematocidal and fungicidal properties, active compositions in the form of mixtures of such compounds with solid and liquid dispersible carrier vehicles, and methods for producing such compounds and for using such compounds in a new way especially for combating pests, e.g. insects, acarids, nematodes and fungi, especially insects and fungi, with other and further objects becoming apparent from a study of the within specification and accompanying examples.

The present invention provides, as new compounds, the phosphoric acid esters of the general formula

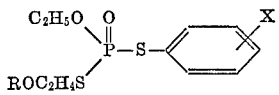

(I)

in which

R is a lower alkyl group, and
X is a hydrogen or halogen atom or a lower alkyl group.

It has been found that the phosphoric acid esters of the General Formula I exhibit marked insecticidal and fungicidal activity.

Compared with compounds of similar structures which are known from the literature or known compounds exhibiting similar directions of activity, the novel compounds of this invention are characterized by substantially improved effects and by very low toxicity to warm-blooded animals. Accordingly, the novel compounds of this invention are of great utility as insecticidal and fungicidal agents.

The present invention also provides a process for the production of a compound of the Formula I in which a dithiophosphate of the general formula

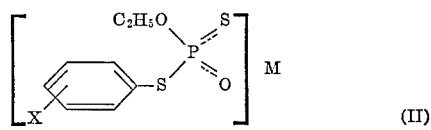

(II)

in which

M is a metal equivalent or an ammonium group, and
X has the meaning stated above, is reacted with a 2-alkoxyethyl halide of the general formula $$\text{Hal—}C_2H_4\text{—O—R} \quad \text{(III)}$$

in which

Hal is a halogen atom, and
R has the meaning stated above.

Preferably, R stands for a $C_1$–$C_4$ alkyl group, namely methyl, ethyl, n- or iso-propyl or n-, iso-, sec- or tert-butyl. X preferably stands for a hydrogen, chlorine, bromine, fluorine or iodine atom or a $C_1$–$C_4$ alkyl group.

M is preferably an ammonium group or an alkali metal atom, such as a sodium or potassium atom. Hal is preferably a chlorine, bromine or iodine atom.

As examples of the O-ethyl-S-(optionally substituted) phenyl dithiophosphates of the Formula II, the following may be mentioned: potassium, sodium or ammonium salt of O-ethyl-S-phenyl dithiophosphate, O-ethyl-S-[4-(3- or 2-)methylphenyl]dithiophosphate, O-ethyl-S-[4-(3- or 2-)chlorophenyl]dithiophosphate and O-ethyl-S-[4-(3- or 2-)bromophenyl]dithiophosphate.

As examples of the 2-alkoxyethyl halides of the Formula III, the following may be mentioned: 2-methoxyethyl bromide (or chloride or iodide), 2-ethoxyethyl bromide (or chloride or iodide), 2-n-(or iso-)propoxyethyl bromide (or chloride or iodide), and 2-n-(iso-, sec.- or tert.-)butoxyethyl bromide (or chloride or iodide).

The reaction is generally conducted in a solvent or diluent. Any inert solvent or diluent may be used for this purpose, but it is preferred to use water; aliphatic, alicyclic, or aromatic hydrocarbons which may be chlorinated, such as hexane, cyclohexane, petroleum ether, ligroin, benzene, toluene, xylene, methylene chloride, chloroform, carbon tetrachloride, mono, di- or tri-chloroethylenes or chlorobenzene; ethers such as diethyl ether, methylethyl ether, di-isopropyl ether, dibutyl ether, ethylene oxide, dioxane or tetrahydrofurane; ketones such as acetone, methylethylketone or methylisobutylketone; nitriles such as acetonitrile, propionitrile or acrylonitrile; alcohols such as methanol, ethanol, isopropanol, butanol or ethylene glycol; esters such as ethyl acetate or amyl acetate; acid amides such as dimethyl formamide or dimethyl acetamide; and sulfones or sulfoxides such as dimethyl sulfoxide and sulpholane.

The reaction may be carried out at temperatures within a broad range. Generally, however, the reaction is effected at a temperature of from about —20° C. to the boiling point of the reaction mixture, preferably from about 0° to 100° C.

The reaction is preferably effected under atmospheric pressure, but it is possible to effect the reaction under reduced or elevated pressure.

The starting O-ethyl-S-(optionally substituted)-phenyl-dithiophosphates may be prepared by known methods; for instance, when M is an alkali metal atom, the compound of the Formula II may be prepared by reacting an O - ethyl - S - (optionally substituted)-phenyldithiophosphoryl chloride with an alkali metal hydroxide, as is shown by the following reaction scheme:

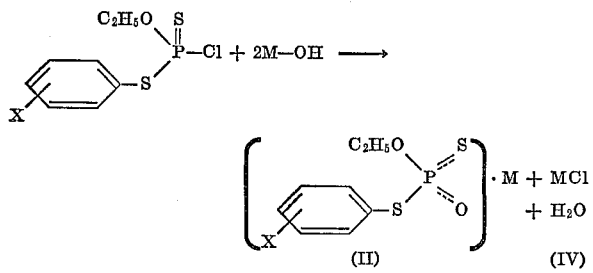

The resulting dithiophosphate of the Formula II may be subsequently reacted with a 2-alkoxyethyl halide ether with or without prior isolation thereof.

The phosphoric acid esters of this invention have an excellent insecticidal property and may be utilized for controlling various harmful insects such as sucking insects, biting insects, harmful plant parasites and insects harmful to hygiene and stored grain. They are especially effective as insecticides against insects harmful to agriculture such as those belonging to the Coleoptera, Lepidoptera, Aphidae, Orthoptera, Isoptera and Acarina, and therefore they can be used as agents for protecting plants from these insects. The compounds also show activity against spider mites (acarids), harmful nematodes living in soil and on plants which cause diseases in plants. The compounds of this invention exhibit a pronounced activity against insects belonging to the Lepidoptera, whose control has been difficult by conventional insecticides.

The phosphoric acid esters of this invention also exhibit excellent fungicidal and growth-preventive activity against fungi which infect plants and can be used for controlling diseases caused by various fungi of a broad range.

As fungicides they can be used effectively for controlling diseases of plants caused by Archimycetes, Phycomycetes, Ascomycetes, Basidiomycetes, Fungi Imperfecti and other fungi. Particularly, they are effective for eradicating fungi which cause diseases of rice plants, fruit trees and vegetables.

The compounds of this invention have an excellent biological activity of such a broad range that they are effective both as insecticides and fungicides, and hence they are of great utility. Further, since they are free of harmful heavy metals, they do not cause any problem of such poisons remaining in crops. Furthermore, they do not exhibit the acute toxicity to humans and domestic animals possessed by parathion or the like, and accordingly they may be used safely and effectively as agricultural chemicals.

The active compounds according to the present invention can be utilized, if desired, in the form of the usual preparations, compositions or formulations with conventional inert (i.e. plant compatible or pesticidally inert) pesticide diluents or carriers.

These may be prepared in known manner, for example by mixing the active compounds with extenders, that is, liquid or solid or gaseous diluents and/or carriers, optionally with the use of conventional pesticide adjuvants, that is, emulsifying agents and/or dispersing agents and/or adhesive agents. In the case of the use of water as an extender, organic solvents and emulsifying agent can, for example, also be used as auxiliary solvents.

As liquid diluents or carriers, there are preferably used aromatic hydrocarbons, such as xylenes, toluene, benzene, dimethyl naphthalene or aromatic naphthas halogenated (chlorinated) aromatic or aliphatic hydrocarbons, such as chlorobenzenes, chloromethylene, chloroethylene or carbon tetrachloride, aliphatic hydrocarbons, such as cyclohexane or paraffins (for example petroleum fractions), alcohols, such as methanol or butanol, ketones such as acetone, methyl ethyl ketone or cyclohexanone, amines such as ethanol amine, ethers such as glycol monomethyl ether, strongly polar solvents, such as dimethyl formamide, dimethyl sulfoxide or acetonitrile, as well as water.

As solid diluents or carriers, there are preferably used ground natural minerals, such as clays, talc, chalk, i.e. calcium carbonate, attapulgite, montmorillonite, diatomaceuus earth or pumice or ground synthetic minerals, such as highly-dispersed silicic acid, alumina or silicates.

As gaseous diluents or carriers there may be used aerosol propellants which are gaseous at normal temperatures and pressures, such as Freon.

Preferred examples of adjuvants (diluents or carriers assistants) include non-ionic, cationic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing or adhesive agents include lignin, sulfite waste liquors and methyl cellulose.

The compounds of the present invention can be used, if desired, together with other agricultural chemicals, for example insecticides, nematocides, fungicides (including antibiotics), herbicides, plant growth-regulators or fertilizers.

The herbicidal composition or formulation according to the present invention generally contains 0.1 to 95 percent by weight, preferably 0.5 to 90% by weight, of the active compound. However, the content of active ingredients may be varied in accordance with the formulation and the applying method, the purpose, the period of application, the place of application and other circumstances.

The compounds may be formulated in any of the usual ways in the field of agricultural chemicals, for example solutions, emulsions, emulsion concentrates, wettable powders, aqueous solutions, oil formulations, aerosols, pastes, fumigants, dusting powders, coating granules, tablets, granules, pellets and the like.

The compounds may be applied to the pests or its habitat in any of the usual ways, for example, by scattering, spraying, atomizing, misting, dusting, mixing, fumigating, injecting or powder-coating methods.

Furthermore, the application can be effected by the so-called "ultra-low-volume" method. In this method it may be possible to use 95% to 100% of the active compound.

In use, the content of the active ingredient in the ready-to-use preparation can be varied over a broad range according to circumstances above. However, it may generally be preferable to use a range from 0.0001 to 20% by weight, especially 0.001 to 5.0% by weight.

Also, the amount of active compound applied per unit area is usually about 15 to 1000 grams, preferably 40 to 600 grams of active compound per 10 ares. However, in special cases, it may be possible to use more or less sometimes such variations may be required.

The invention therefore provides a pesticidal composition containing as active ingredient a compound according to the invention in admixture with a solid diluent or carrier or in admixture with a liquid diluent or carrier, if desired, containing adjuvant.

The invention provides a method of combating harmful pests which comprises applying to these pests or a habitat thereof a compound according to the invention alone or in the form of a composition containing as active ingredient a compound according to the invention in admixture with a solid or liquid diluent or carrier or adjuvant.

The invention also provides plants protected from damage by seeds by being grown in areas in which, immediately prior to and/or during the time of the growing, a compound according to the invention was applied alone or in admixture with a solid or liquid diluent or carrier. It will be seen that the usual methods of providing harvested agricultural products may be improved by the present invention.

The unexpected superiority and outstanding activity of the particular new compounds of the present invention is illustrated without limitation by the following examples.

EXAMPLE 1

11.2 g. of potassium hydroxide are dissolved in 50 ml. of water and 150 ml. of dioxane are added to the solution. At 10–20° C., 28.7 g. of O-ethyl-S-(4-chlorophenyl)dithiophosphoryl chloride (boiling point=130–134° C./0.3 mm. Hg; $n_D^{20}$=1.6132) are added dropwise. The temperature is gradually raised and the solution is agitated for 1 hour at 50° C. To the reaction mixture are added 15.3 g. of 2-ethoxyethyl bromide, and the reaction mixture is stirred at 60° C. for 3 hours to complete the reaction. Most of the dioxane is distilled off, the residue is dissolved in benzene, and the resulting solution is washed with water and 1% aqueous sodium carbonate solution and dried over anhydrous sodium sulfate. Then the benzene is distilled off and vacuum distillation of the residue gives 19 g. of a faintly yellow oil, O-ethyl-S-(2-ethoxyethyl)-S-(4-chlorophenyl)phosphorodithiolate having the following formula

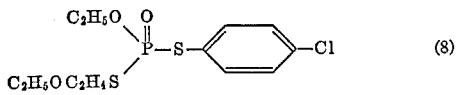
(8)

and which is characterized by a boiling point of 159–163° C./0.2 mm. Hg and a refractive index $n_D^{20}$ of 1.5636. This compound is identified hereinafter as compound No. 8.

EXAMPLE 2

The following compounds may be prepared by methods analogous to that described in Example 1.

EXAMPLE 3

15 parts of Compound 6, 80 parts of diatomaceous earth and clay and 5 parts of the emulsifier "Runnox" (product of Toho Kagaku Kogyo K.K., Japan) are ground and mixed together to form a wettable powder. It is diluted with water for actual application. [Diatomaceous earth and clay (3:2); "Runnox": polyoxyethylenealkylarylether.]

EXAMPLE 4

30 parts of Compound 2, 30 parts of xylene, 30 parts of "Kawakazol" (product of Kawasaki Kasei Koygo K.K. Japan), and 10 parts of the emulsifier "Sorpol" (product of "Kawakazol" (product of Kawasaki Kasei Koygo K.K., stirring to form an emulsifiable preparation. It is diluted with water for actual application. ["Kawakazol": aliphatic hydrocarbons with a high boiling point; "Sorpol": polyoxyethylenealkylarylether.]

EXAMPLE 5

10 parts [1] of Compound 9, 10 parts of bentonite, 78 parts [1] of clay and 2 parts [1] of lignin sulfonate are formed into a mixture and it is intimately with 25 parts [1] of water. The mixture is finely divided by means of an extruding granulator to give particles of 20–40 mesh, followed by drying at 40–50° C.

EXAMPLE 6

2 parts [1] of Compound 7 and 98 parts [1] of a mixture of talc and clay are ground and mixed together to form a powdery ready-to-use preparation. [Talc and clay (3.1).]

EXAMPLE 7

Preparation of active compound

Solvent: 3 parts by weight of dimethylformamide
Emulsifier: 0.1 part by weight of alkylarylpolyglycol ether One part by weight of active compound is mixed with the above-mentioned amount of the solvent containing the above amount of the emulsifier, and the resulting mixture is diluted with water to give the prescribed concen-

TABLE 1

| Compound number | Structural formula | Boiling point, °C./mm. Hg | Refractive index, $n_D^{20}$ |
|---|---|---|---|
| 1 | $C_2H_5O$\P(=O)-S-C_6H_5 / $CH_3OC_2H_4S$ | -------- | 1.5617 |
| 2 | $C_2H_5O$\P(=O)-S-C_6H_5 / $C_2H_5OC_2H_4S$ | -------- | 1.5511 |
| 3 | $C_2H_5O$\P(=O)-S-C_6H_5 / $n$-$C_3H_7OC_2H_4S$ | -------- | 1.5371 |
| 4 | $C_2H_5O$\P(=O)-S-C_6H_5 / $n$-$C_4H_9OC_2H_4S$ | -------- | 1.5330 |
| 5 | $C_2H_5O$\P(=O)-S-$C_6H_4$-$CH_3$ / $C_2H_5OC_2H_4S$ | 149-153/0.1 | 1.5543 |
| 6 | $C_2H_5O$\P(=O)-S-$C_6H_4$-$CH_3$ / $i$-$C_3H_7OC_2H_4S$ | 150-154/0.1 | 1.5469 |
| 7 | $C_2H_5O$\P(=O)-S-$C_6H_4$-$CH_3$ / $n$-$C_4H_9OC_2H_4S$ | 160-162/0.1 | 1.5428 |
| 9 | $C_2H_5O$\P(=O)-S-$C_6H_4$-Cl / $i$-$C_3H_7OC_2H_4S$ | 158-162/0.15 | 1.5565 |

[1] The term "parts" used in Examples 5 to 8 means weight.

tration of the active compound in the ready-to-use preparation.

Test on tobacco cutworm (*Prodenia litura*) larvae

Test procedure: Sweet-potato leaves are dipped in the preparation containing the compound of this invention at the prescribed concentration, dried in air and placed into a 9 cm. diameter Petri dish. Then 10 third-instar tobacco cutworm larvae are put into the dish which is then kept in a thermostat chamber maintained at 28° C. After 24 hours have passed, the number of dead larvae is counted and the killing ratio is calculated. Results are shown in Table 2.

TABLE 2.—RESULTS OF TESTS ON TOBACCO CUTWORM LARVAE

| Active ingredient concentration, percent | Killing ratio (percent) | | |
|---|---|---|---|
| | 0.1 | 0.03 | 0.01 |
| Compound number: | | | |
| 1 | 100 | 100 | 100 |
| 2 | 100 | 100 | 100 |
| 3 | 100 | 100 | 100 |
| 4 | 100 | 100 | 100 |
| 5 | 100 | 90 | 30 |
| 6 | 100 | 95 | 70 |
| 7 | 100 | 95 | 30 |
| 8 | 100 | 100 | 50 |
| 9 | 100 | 100 | 60 |
| Sumithion [1] (commercially available comparison) | 100 | 70 | 20 |

[1] Sumithion: O,O-dimethyl-O-(3-methyl-4-nitrophenyl) thiophosphate.

EXAMPLE 8

Test on the adult house fly (*Musca domestica*)

Test procedure: A sheet of filter paper is spread in a Petri dish of 9 cm. diameter and 1 ml. of an aqueous preparation, containing the active compund at the prescribed concentration and prepared in the same manner as in Example 7, is poured into the dish. Then 10 female adult house flies are put into the dish which is then kept for 24 hours in a thermostat chamber maintained at 28° C. The number of the dead insects is counted and the killing ratio is calculated. The results are shown in Table 3.

TABLE 3.—RESULTS OF TESTS ON ADULT HOUSE FLIES

| Active compound concentration, percent | Killing ratio (percent) | |
|---|---|---|
| | 0.1 | 0.01 |
| Compound number: | | |
| 1 | 100 | 100 |
| 2 | 100 | 100 |
| 3 | 100 | 100 |
| 4 | 100 | 90 |
| 5 | 100 | 90 |
| 6 | 100 | 100 |
| 7 | 100 | 60 |
| 8 | 100 | 100 |
| 9 | 100 | 100 |

EXAMPLE 9

Test on German cockroaches (Blattella)

Test procedures: A sheet of filter paper is spread in a Petri dish of 9 cm. diameter and 1 ml. of an aqueous preparation, containing the active compound at the prescribed concentration and prepared in the same manner as in Example 7, is poured into the dish. Then 10 German cockroach imagines are put into the dish and it is kept for 24 hours in a thermostat chamber maintained at 28° C. The number of dead creatures is counted and the killing ratio is calculated. The results are shown in Table 4.

TABLE 4.—RESULTS OF TESTS ON GERMAN COCKROACHES

| Active compound concentration, percent | Killing ratio (percent) | |
|---|---|---|
| | 0.1 | 0.01 |
| Compound number: | | |
| 2 | 100 | 100 |
| 5 | 100 | 100 |
| 6 | 100 | 100 |
| 7 | 100 | 20 |
| 8 | 100 | 100 |
| 9 | 100 | 100 |

EXAMPLE 10

Test on mosquito larvae (*Culex molestus*)

Test procedure: A tall Petri dish of 9 cm. diameter is charged with 100 ml. of an aqueous preparation, containing the active compound at the prescribed concentration and prepared in the same manner as in Example 7, and 25 fourth-instar mosquito larvae are put into the dish. The dish is kept in a thermostat chamber maintained at 28° C. for 24 hours. Then the number of dead larvae is counted and the killing ratio is calculated. Results are shown in Table 5.

TABLE 5.—RESULTS OF TEST ON MOSQUITO LARVAE

| Active ingredient concentration, p.p.m. | Killing ratio (percent) | |
|---|---|---|
| | 0.1 | 0.01 |
| Compound number: | | |
| 2 | 100 | 100 |
| 5 | 100 | 100 |
| 6 | 100 | 100 |
| 7 | 100 | 100 |
| 8 | 100 | 100 |
| 9 | 100 | 100 |

EXAMPLE 11

Preparation of active compound

Solvent: one part by weight of acetone
Dispersing agent: 0.05 part by weight of sodium oleate
Other additive: 0.2 part by weight of gelatin
Water: 98.75 parts by weight A concentrated emulsifiable liquor obtained by mixing an active compound in a prescribed amount with the above amount of the solvent is diluted with the above amount of water containing the above amounts of the above dispersing agent and additive to form the preparation.

(i) Test on rice blast (*Piricularia oryzae*)/(pot test)

Test of preventive effect: Rice plant (Jukkoku variety) is cultivated in a pot of 12 cm. diameter and the preparation of the active compound prepared in the same manner as in Example 7 is sprayed on the rice plant in an amount of 50 ml. per 3 pots.

The sprayed rice plant is kept in a chamber maintained at 25° C. and a relative humidity of 100% for 2 days from the next day after the chemical spraying. While kept in the chamber the rice plant is inoculated twice with a suspension of spores of artificially cultured pathogenic fungi of blast by spraying.

Seven days after inoculation, the degree of infestation was determined by applying a scale ranging from 0 to 5, and the control value of each particular active compound against *Piricularia oryzae* was determined in accordance with the formula below:

| Degree of infestation: | Infested area of leaf in percent of total leaf |
|---|---|
| 0 | 0% |
| 0.5 | 0–2% |
| 1 | 2–5% |
| 2 | 5–10% |
| 3 | 10–20% |
| 4 | 20–40% |
| 5 | 40 or more percent |

Control value $$= \frac{\left(\begin{array}{c}\text{Degree of infestation}\\\text{of control plant}\end{array}\right) - \left(\begin{array}{c}\text{Degree of infestation}\\\text{of treated test plant}\end{array}\right)}{\text{Degree of infestation of treated test plant}}$$

$$\times 100$$

At the same time, the phytotoxicity against rice plants was determined.

The particular active compounds tested, their concentrations and the average results obtained can be seen from the following Table 6.

(ii) Test on sheath blight (*Pellicularia sasakii*)/(pot test)

Test procedure: Rice plant (Kinmaze variety) is cultivated in a 12 cm. diameter pot, and at the tillering stage the preparation of active compound prepared in the same manner as in Example 9, is applied to the rice plant in an amount of 50 ml. per 3 pots.

The next day, the root of the treated rice plant is inoculated with pathogenic fungi of sheath blight which has been cultured in a barley culture medium for 10 days and in which sclerotia has been formed. Then the plant is kept in an inoculation chamber maintained at 28–30° C. and a relative humidity of more than 95% for 8 days.

The infestation of the stems was determined and characterized by the values $n_0$ to $n_3$ having the meaning given below.

The degree of infestation was determined by means of the Formula 1 and the control value of each compound was calculated in accordance with the Formula 2:

$$\text{Degree of infestation} = \frac{3 \cdot n_3 + 2 \cdot n_2 + 1 \cdot n_1 + 0 \cdot n_0}{3 \cdot N} \times 100 \quad (1)$$

wherein
N = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom)

Control value =

$$\frac{\left(\begin{array}{c}\text{Degree of infestation of}\\ \text{non-treated control plants}\end{array}\right) - \left(\begin{array}{c}\text{Degree of infestation}\\ \text{of treated test plants}\end{array}\right)}{\text{Degree of infestation of treated test plants}}$$

The active compounds tested, their concentrations and the average results can be seen from the following table.

The phytotoxicity of the chemical was also examined. The results are given in the following Table 6 wherein the symbol "—" means that the chemical did not adversely affect the growth of the rice plant.

TABLE 6.—TESTS OF EFFECTS AGAINST BLAST AND SHEATH BLIGHT

| Compound number: | Active ingredient concentration (p.p.m.) | Protective value Blast | Protective value Sheath blight | Phytotoxicity [1] |
|---|---|---|---|---|
| 2 | 500 | 80 | | (—) |
| 5 | 500 | 80 | 77 | (—) |
| 6 | 500 | 100 | 86 | (—) |
| 7 | 500 | 94 | 81 | (—) |
| 8 | 500 | 100 | | (—) |
| 9 | 500 | 100 | | (—) |
| IBP [2] (commercially available comparison). | 480 | 68 | 75 | (—) |
| Untreated control | 0 | 0 | 54 | |

[1] The symbol "(—)" indicates that the chemical does not adversely affect the growth of the rice plant.
[2] IBP = O,O-diisopropyl-S-benzyl thiophosphate.

It will be appreciated that the instant specification and examples are set forth by way of illustration and not limitation, and that various modifications and changes may be made without departing from the spirit and scope of the present invention.

What is claimed is:
1. A phosphoric acid ester of the general formula

in which
R is a lower alkyl group, and
X is a hydrogen or halogen atom or a lower alkyl group.

2. Compound according to claim 1 in which R is a $C_1$–$C_4$ alkyl group and X is a hydrogen, chlorine, bromine, fluorine or iodine atom or a $C_1$–$C_4$ alkyl group.

3. Compound according to claim 1, wherein such compound is O-ethyl-S-(2-methoxyethyl)-S-phenyl-phosphorodithiolate of the formula

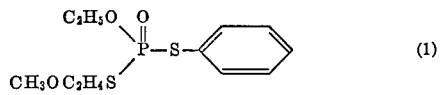

4. Compound according to claim 1, wherein such compound is O-ethyl-S-(2-ethoxyethyl)-S-phenyl-phosphorodithiolate of the formula

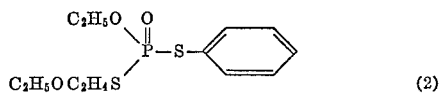

5. Compound according to claim 1, wherein such compound is O-ethyl-S-(2-n-propoxyethyl)-S-phenyl-phosphorodithiolate of the formula

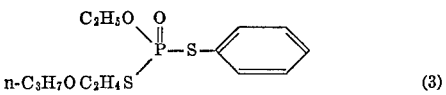

6. Compound according to claim 1, wherein such compound is O-ethyl-S-(2-isopropoxyethyl)-S-(4-methylphenyl)phosphorodithiolate of the formula

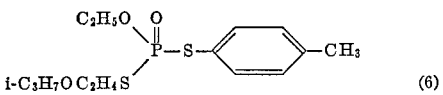

7. Compound according to claim 1, wherein such compound is O-ethyl-S-(2-ethoxyethyl)-S-(4-chlorophenyl)-phosphorodithiolate of the formula

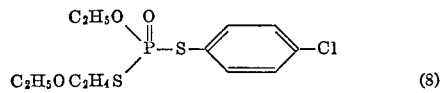

8. Compound according to claim 1, wherein such compound is O-ethyl-S-(2-isopropoxyethyl)-S-(4-chlorophenyl)-phosphorodithiolate of the formula

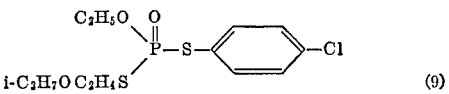

References Cited
UNITED STATES PATENTS
2,586,655  2/1952  Hook et al. _____ 260—950 X LEWIS GOTTS, Primary Examiner
A. H. SUTTO, Assistant Examiner U.S. Cl. X.R.
424—217